(12) United States Patent
Shinkai et al.

(10) Patent No.: US 6,881,499 B2
(45) Date of Patent: Apr. 19, 2005

(54) BONDED MEMBER COMPRISING DIFFERENT MATERIALS AND PRODUCTION METHOD THEREOF

(75) Inventors: Masayuki Shinkai, Ama-gun (JP); Takahiro Ishikawa, Toyoake (JP); Masahiro Kida, Ama-gun (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/348,255

(22) Filed: Jan. 21, 2003

(65) Prior Publication Data

US 2003/0157360 A1 Aug. 21, 2003

(30) Foreign Application Priority Data

Jan. 25, 2002 (JP) ......................................... 2002-017762

(51) Int. Cl.[7] .......................... B32B 15/04; B32B 15/08; B32B 18/00
(52) U.S. Cl. ........................ 428/672; 428/666; 428/627; 428/632; 428/336; 428/621; 428/681; 428/660
(58) Field of Search ...................... 156/345.14; 438/729; 428/621, 620, 627, 630, 632, 666, 665, 664, 663, 672, 678, 680, 681, 660, 687, 34.1, 220, 214, 217, 336; 219/634

(56) References Cited

U.S. PATENT DOCUMENTS

| | | | | |
|---|---|---|---|---|
| 5,023,147 A | * | 6/1991 | Nakata et al. ............... | 428/627 |
| 5,108,025 A | * | 4/1992 | Kang et al. .................. | 228/122 |
| 5,197,654 A | * | 3/1993 | Katz et al. ................... | 228/124 |
| 6,391,473 B2 | * | 5/2002 | Numakura et al. .......... | 428/627 |
| 6,635,358 B2 | * | 10/2003 | Shinkai ...................... | 428/621 |
| 2002/0038813 A1 | * | 4/2002 | Shinkai ................... | 228/124.5 |

FOREIGN PATENT DOCUMENTS

| | | | |
|---|---|---|---|
| JP | 10-209255 | * | 8/1998 |
| JP | 11-278951 | | 10/1999 |
| JP | 2001-199775 | * | 7/2001 |
| JP | 2002-37679 | | 2/2002 |
| JP | 2002-47072 | * | 2/2002 |
| JP | 2002-037679 | * | 2/2002 |

OTHER PUBLICATIONS

Enjo, Toshio. *Diffusion Bonding*, Nikkei Mechanical 1987.6.1 pp. 103–109 Osaka University, no month.

* cited by examiner

Primary Examiner—Michael La Villa
(74) Attorney, Agent, or Firm—Burr & Brown (57) ABSTRACT

A bonded member includes a ceramic base material and a metal member solid-phase bonded via a soldering material. An active metal is placed on a surface of the ceramic base material and the soldering material, which includes Au, is placed on the active metal, and the active metal and the soldering material are heated so as to form a precoat layer. The metal member is placed on the surface of the precoat layer via a barrier layer, which is capable of inhibiting diffusion of a metal constituting the metal member, and the precoat layer and the metal member are pressurized heated so as to be solid-phase bonded. The production method of the bonded member is also disclosed.

32 Claims, 5 Drawing Sheets

BONDED MEMBER COMPRISING DIFFERENT MATERIALS AND PRODUCTION METHOD THEREOF

BACKGROUND OF THE INVENTION

1. Field of the Invention

The present invention relates to a bonded member comprising different types of materials and a production method thereof. More specifically, the present invention relates to a bonded member comprising different types of materials which is usable at high temperatures and a production method thereof.

2. Description of the Related Art

To bond different types of materials such as a ceramic base material and a metal member to each other, a method using a soldering material can be used. However, during a cooling process in high-temperature bonding, since thermal stress is generated due to the difference in thermal expansion coefficient between the different materials or between the soldering material used for bonding the different materials together and the materials, cracks are formed in the vicinity of the interface when one of the members is brittle, or the separation occurs at the interface between the members. Accordingly, the desired bonding strength and air tightness may not be able to be attained in some cases. Since products having aforementioned troubles broken during a production process must be discarded as defective products, this results in an unfavorable increase in production cost of these composite members. Further, if the product is subjected to thermal cycle in use, these troubles often occur after use for a certain time period to cause deterioration of reliability of the product.

As a method for bonding different materials together by use of a soldering material, a metallization bonding method and a direct bonding method are available. The metallization bonding method is a method in which a metal material is bonded to a surface of ceramic by forming a metal layer on the ceramic surface by a vapor phase process such as deposition from a vapor phase, vapor deposition or sputtering or a process in which a paste is applied to the ceramic surface which is then heated. As the direct bonding method, an active metal method is well-known. This is a method in which a metal material is bonded to a surface of ceramic by use of an element in the group IV as an insert material. Meanwhile, in these methods, unless some measures are taken against thermal stress which occurs at the interface between the bonded materials, the ceramic base material which is vulnerable to the thermal stress may often be cracked or separation may occur at the interface, so that bonding strength as well as various properties required as a composite member such as air tightness may be influenced. Particularly, it is very difficult to bond a low-strength member such as aluminum nitride to a different material such as a metal material with the above problems inhibited from occurring.

To solve the above problems, a method of bonding the base material and the metal member together through liquid-phase bonding using a soldering material comprising a low-strength metal such as Ag, Cu or Au which undergoes plastic deformation by low stress can be conceived. However, in a case where Ag or Cu is used, they may be difficult to use in some cases due to a problem caused by oxidation of the soldering material when a bonded member is exposed to an application environment of 400° C. or higher under oxidizing atmosphere, a problem caused by volatilization of the soldering material caused by their high vapor pressures when they are used at a high temperature and a low pressure, a problem of migration when energized and used, or a problem of a reaction with an Mo oxide. Meanwhile, use of Au is effective for avoiding the problems occurring when Ag or Cu is used. However, when Ni, Co, Kovar or other metal is used as a metal material having excellent oxidation resistance, its constituents (Fe, Ni, Co) are diffused into Au when the metal material is heated, thereby increasing the strength of the soldering material. As a result, residual stress at the time of bonding cannot be absorbed sufficiently by plastic deformation of the soldering material, and bonding strength lowers due to heat applied upon or after completion of the bonding. Consequently, when the bonded member undergoes a thermal cycle or thermal shock is given thereto, the ceramic base material may be cracked.

Further, it is known that when an Au-18Ni soldering material and a conductive material (Mo) are bonded together, Ni in the soldering material reacts with Mo and forms a brittle structure. Accordingly, when use of a resulting binding component as a member for a high-temperature heater is considered, there arises a problem that durability of the component when the interface between bonded members is exposed to a thermal cycle and thermal shock lowers and sharply deteriorates, thereby preventing further use of the component.

Further, when kovar is used as the metal material, for example, components (Fe, Ni, Co) constituting Kovar are diffused into the soldering material when the base material and Kovar are bonded together and form an intermetallic compound having low conductivity, so that there arise problems of deterioration of thermal properties and occurrence of abnormal heat generation at the site.

Meanwhile, use of metal not being solid soluble in Au as a metal material may also be possible. Illustrative examples of metal materials capable of meeting such requirement mentioned above may include W and Mo. However, these metal materials have a problem that they are oxidized vigorously at a high temperature in air and cannot be used as a metal material for a high-temperature heater exposed to conditions such as mentioned above.

Figure 4:
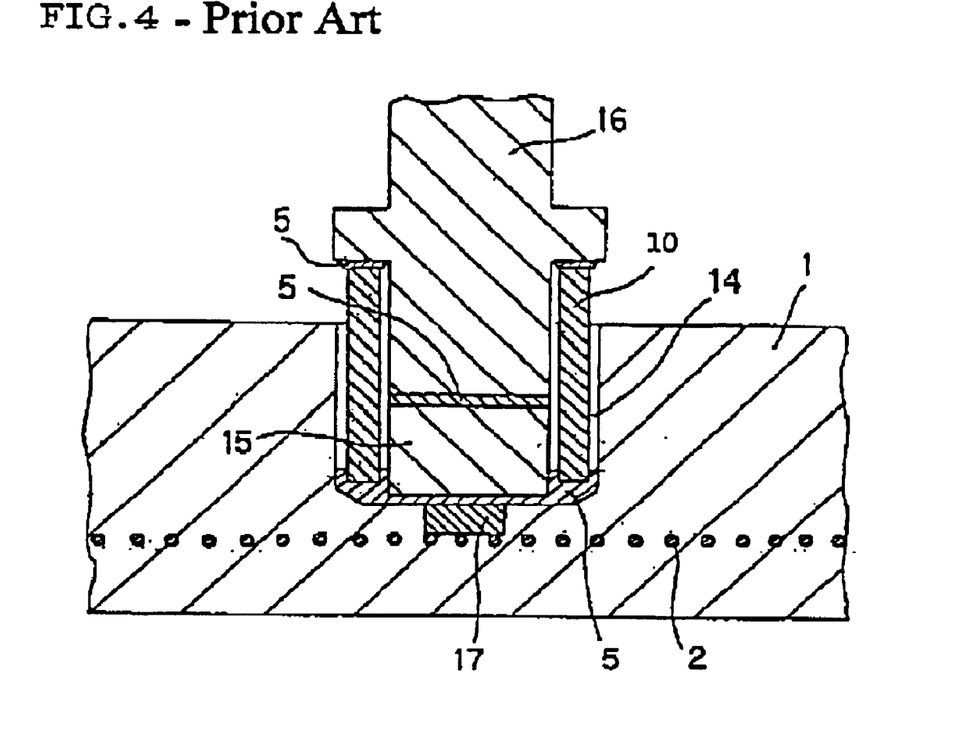
FIG. 4 is a cross sectional diagram illustrating an embodiment of a bonded structure of a susceptor (prior art) for mounting a semiconductor wafer.

To solve the above problem, an attempt to use a special design as a bonded structure has been made. For example, in JP-A-209255/1998, a bonded structure of a ceramic base material and a connector for power supply according to the structure shown in FIG. 4 is disclosed as a susceptor for mounting a semiconductor wafer. In FIG. 4, a hole 14 is formed in a ceramic base material 1. From the hole 14, a metal member 17 such as Mo which is embedded in the ceramic base material 1 in advance and has a thermal expansion coefficient close to that of the ceramic base material 1 is exposed. Further, in the hole 14, a cylindrical atmosphere protecting member 10 is inserted. In the atmosphere protecting member 10, a connector 16 for supplying power and a low heat expanding member 15 for alleviating stress are inserted. The atmosphere protecting member 10 and the connector 16 are hermetically bonded to each other by means of a soldering material 5, and the low heat expanding member 15 and the atmosphere protecting member 10 are hermetically bonded to the metal member 17 by means of the soldering material 5.

According to this bonded structure, residual stresses upon bonding the low heat expanding member 15 and the metal member 17 are alleviated, and oxidation of the metal member 17 such as Mo is inhibited by the atmosphere protecting member 10. Thus, even if they are bonded by means of a high strength soldering material such as the foregoing Au-18Ni, no cracks occurs in the ceramic base material at the time of bonding, a change in strength due to heat is small, and endurance reliability when bonded portions are exposed to a thermal cycle and thermal shock upon use of a high temperature heater is also high. However, the bonded structure has such problems that the number of components is large and that if the atmosphere protecting member 10 and the metal member 17 are not fully bonded to each other, deterioration occurs due to oxidation of the metal member 17, so that a very high production control ability is required.

Figure 5:
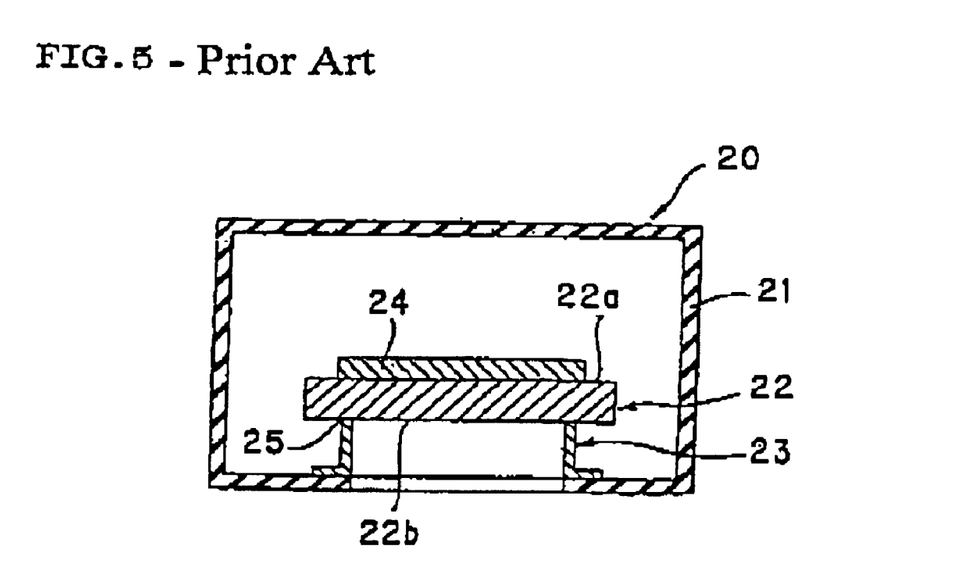
FIG. 5 is a cross sectional diagram illustrating another embodiment of the bonded structure of the susceptor (prior art) for mounting a semiconductor wafer.
Figure 6:
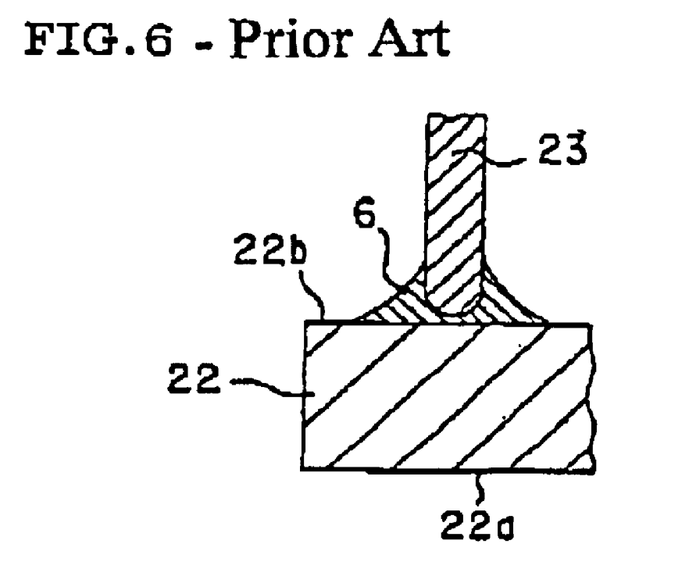
FIG. 6 is a local cross sectional diagram illustrating an embodiment of a bonded form of a ring and a susceptor according to the prior art.
Figure 7:
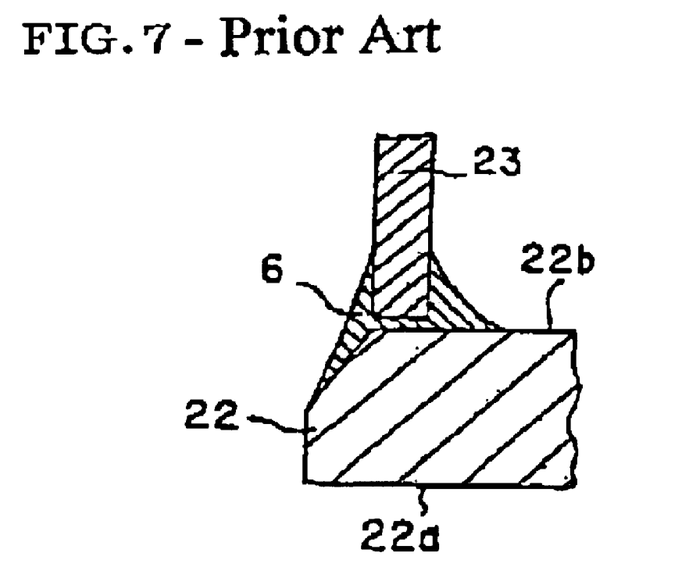
FIG. 7 is a local cross sectional diagram illustrating another embodiment of the bonded form of the ring and the susceptor according to the prior art.

Further, JP-A-11-278951 discloses, as a susceptor for mounting a semiconductor wafer, a bonded member adopting such a member structure as one shown in FIG. 6 or 7 so as to alleviate thermal stress which occurs when a corrosion-resistant metal ring 23 such as Kovar is bonded to a back side 22b of a ceramic susceptor 22 in a ceramic base material associated with the structure shown in FIG. 5, and a production method thereof. However, although adoption of such a member structure is effective for alleviation of thermal stress, since a Cu-based soldering material is used, usable temperatures are limited due to such problems as oxidation of the soldering material and evaporation of the soldering material caused by a vapor pressure.

To avoid the above problems, the present inventors have proposed a solid-phase bonded component formed by bonding a metal member comprising Ni to another member by means of a soldering material comprising Au, as disclosed in Japanese Patent Application No. 2000-227291. According to a method disclosed in the application, a brittle member and a member of different type can be bonded together with high reliability. However, when the solid-phase bonded material comprising the Au soldering material and the Ni metal member is kept in a high-temperature atmosphere exceeding 750° C. for a long time, a phenomenon that Ni is gradually diffused into Au and the strength of Au thereby increases in observed. Consequently, when a composite member which comprises a ceramic base material having an Au soldering material as a precoat layer and a metal member comprising Ni or the like is used as a member for an electrical apparatus exposed to temperatures exceeding 700° C. upon use, for example, a susceptor for mounting a semiconductor wafer, a problem that the ceramic base material cracks within a relatively short period is liable to occur.

Further, it is known that Pt is diffused in Au slowly, and JP-A-2001-199775 discloses a method in which ceramic and metal are bonded together by means of a soldering material composed essentially of Au and the metal is coated with Pt as a barrier layer so as to prevent diffusion of the metal component. However, when Ti is used for bonding ceramic to a soldering material, Pt cannot be used as a barrier layer. For example, when ceramic and a metal material coated with Pt are bonded together by use of Au and Ti, bonding between Au and ceramic does not occur effectively when liquid phase bonding disclosed in JP-A-199775/2001 is carried out. It is understood that this is because Ti fused into Au is drawn to the Pt layer due to good affinity between Pt and Ti, and resultantly this causes the shortage of Ti to be used for the formation of a TiN reaction layer at the interface. Accordingly, the formation of the TiN layer is unsatisfactory and bonding strength between the Au soldering material and ceramic is lowered.

Further, even when a Pt coating material is solid-phase bonded to an Au precoat layer using Ti as an active material in accordance with the method disclosed in the prior application laid-open as Japanese Patent Application No. 2000-47291 by the present inventors, a trace amount of Ti in an Au soldering material is drawn to Pt during the period of using such a bonded member at a temperature equal to or higher than a specific temperature, thereby bonding strength between ceramic and an Au soldering material layer is lowered. Furthermore, the bonding strength is also lowered due to Karkendal voids occurring in the vicinity of the interface of the Pt coating material upon movement of these atoms. Therefore, this method is difficult to be employed for the production of bonded members for certain use.

SUMMARY OF THE INVENTION

The present invention has been made in consideration of such problems of the prior art. An object of the present invention is to provide a bonded member comprising different materials wherein a ceramic base material and a metal member are solid-phase bonded with the formation of a barrier layer capable of inhibiting diffusion of Ni into an Au soldering material (precoat layer) therebetween so as to inhibit an increase in hardness of Au effectively and make the bonded member usable even at a high temperature; and a production method thereof.

A bonded member comprising different materials according to the present invention which can achieve the above object is a bonded member comprising a ceramic base material and a metal member which are solid-phase bonded via a soldering material, wherein an active metal or a metallized layer is placed on a surface of the ceramic base material, the soldering material comprising Au is placed on the active metal or metallized layer, the active metal or metallized layer and the soldering material are then heated to form a precoat layer, the metal member is then placed on the surface of the precoat layer via a barrier layer, and the precoat layer and the metal member are pressurized and heated so as to be solid-phase bonded.

Further, another bonded member comprising different materials according to the present invention which can achieve the above object is a bonded member comprising a ceramic base material and a metal member which are solid-phase bonded via a soldering material, wherein an active metal or a metallized layer is placed on a surface of the ceramic base material, the soldering material comprising Au is placed on the active metal or metallized layer, the active metal or metallized layer and the soldering material are then heated to form a precoat layer, the metal member comprising Cr or an alloy containing Cr as a major component is placed on the precoat layer, and the precoat layer and the metal member are pressurized and heated so as to be solid-phase bonded.

A production method of a bonded member comprising different materials according to the present invention capable of attaining the above object is a method for producing a bonded member comprising a ceramic base material and a metal member which are solid-phase bonded via a soldering material, wherein said method comprises the steps of placing an active metal or a metallized layer on a surface of a ceramic base material, placing a soldering material comprising Au on the active metal or metallized layer, heating the active metal or metallized layer and the soldering material together so as to form a precoat layer, placing a metal member on the surface of the precoat layer via a barrier layer, and pressurizing and heating the precoat layer and the metal member so as to solid-phase bond them to each other.

Another production method of a bonded member comprising different materials according to the present invention capable of attaining the above object is a method for producing a bonded member comprising a ceramic base material and a metal member which are solid-phase bonded via a soldering material, wherein said method comprises the steps of placing an active metal or a metallized layer on a surface of a ceramic base material, placing a soldering material comprising Au on the active metal or metallized layer, heating the active metal or metallized layer and the soldering material together so as to form a precoat layer, placing a metal member comprising Cr or an alloy containing Cr as a major component on the precoat layer, and pressurizing and heating the precoat layer and the metal member so as to solid-phase bond them to each other.

Thus, according to the method of the present invention for producing a bonded member comprising different materials, a ceramic base material and a metal member which are different types of materials are solid-phase bonded via a soldering material comprising Au (precoat layer) and a barrier layer, or a ceramic base material and a metal member comprising Cr or an alloy containing Cr as a major component are solid-phase bonded via a soldering material comprising Au. Accordingly, there can be obtained a bonded member in which diffusion of a metal material such as Ni, which such a metal material hardens severely the Au soldering material when such a metal material is dissolved and solidified in the Au soldering material, into the soldering material is prevented and an unfavorable increase in proof stress of the Au soldering material are suppressed by the barrier layer even when the bonded member according to the present invention is used at a higher temperature. Thus, the bonding strength of the bonded member is hardly lowered even at a higher temperature. The bonded member comprising different materials according to the present invention is a bonded member comprising different materials being producible by the foregoing production method of the present invention.

BRIEF DESCRIPTION OF THE DRAWINGS

FIGS. 1 (a) to (c) are a schematic diagram illustrating a first embodiment of a method for producing a bonded member of different materials according to the present invention wherein (a) shows a first step and (b) and (c) show a second step, respectively.

FIGS. 2 (a) and (b) are a schematic diagram illustrating a second embodiment of the method for producing a bonded member of different materials according to the present invention wherein (a) shows a first step and (b) shows a second step.

FIGS. 3 (a) and (b) are a schematic diagram illustrating another embodiment of the method for producing a bonded member of different materials according to the present invention wherein (a) shows a first step and (b) shows a second step.

DETAILED DESCRIPTION OF THE PREFERRED EMBODIMENT

Hereinafter, embodiments of the present invention will be described. However, the present invention shall not be limited to the following embodiments. It should be understood that modifications and improvements with respect to its design might be made as required based on general knowledge of those skilled in the art without deviating from the scope of the present invention.

Figure 1A:
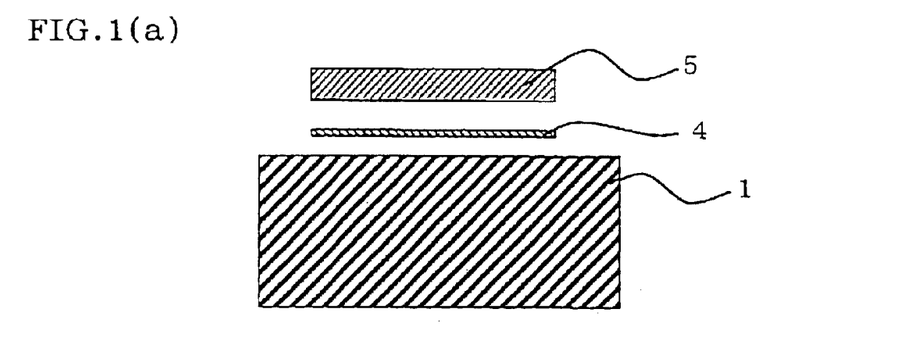
Figure 1B:
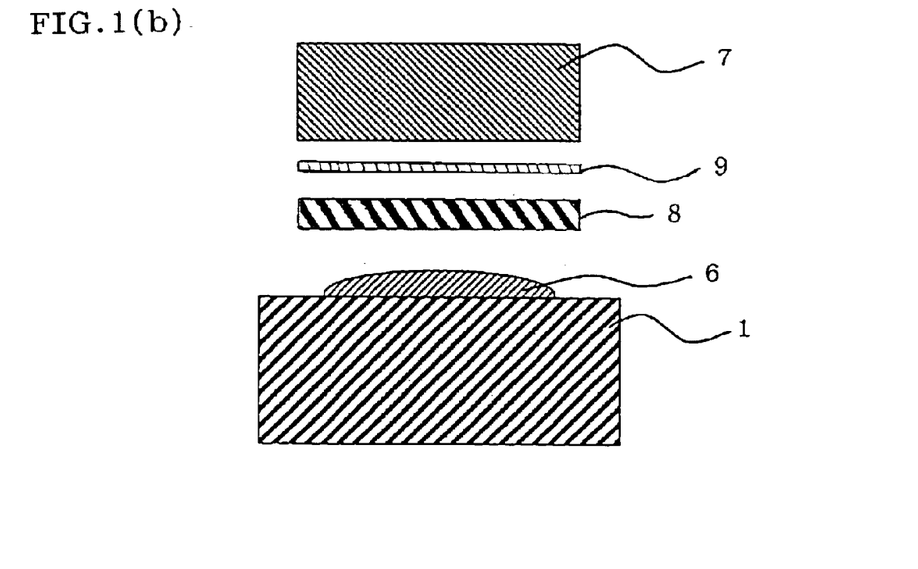
Figure 1C:
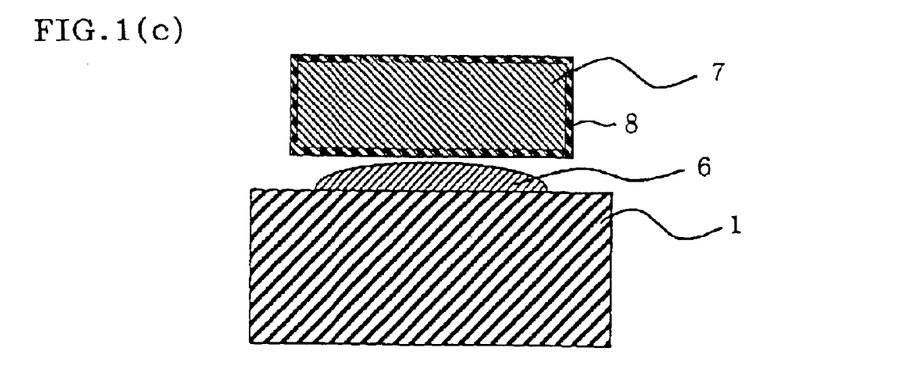

FIGS. 1 (a) to (c) are a schematic diagram illustrating a first embodiment of a method for producing a bonded member of different materials according to the present invention wherein (a) shows a first step and (b) and (c) show a second step.

In the first step, active metal foil 4 and a soldering material 5 which comprises Au (hereinafter referred to as "Au soldering material") are placed on a surface of a ceramic base material 1 so as to cover the surface of the material 1, and then the resultant is heated to form a precoat layer 6. In the subsequent second step, a barrier layer 8 which is a Cr plate is placed on the precoat layer 6 thus formed, an Au soldering material 9 is placed on the barrier layer 8, a metal member 7 is placed on the soldering material 9, and the resultant is then pressurized and heated so as to be solid-phase bonded without melting the Au precoat layer 6 and the Au soldering material 9. Thus, a bonded member comprising different materials to the present invention is obtained by one of the foregoing production methods according to the present invention.

To form the precoat layer, the Au soldering material may be placed on the active metal film by sputtering and then the resultant may be heated to be molten, or a paste containing the active metal and Au may be coated on the ceramic base material and then the resultant may be heated to be molten.

Alternatively, the Au precoat layer may be formed on a metallized ceramic base material. To metallize the ceramic base material, a metallized layer is formed by virtue of a paste or vapor containing a metal. When a metal which forms the metallized layer is metal such as W which is not likely to dissolve in Au to harden the Au precoat layer, the Au soldering material is molten to form the precoat layer. Meanwhile, in the case of metal, which is likely to dissolve in Au to harden the Au precoat layer, solid-phase bonding is performed without melting Au. Illustrative examples of metals other than W which form the metallized layer include Mo, Mo—Mn, W—Mn, and mixtures prepared by adding additives such as $SiO_2$ and $TiO_2$ to the foregoing metal or alloys. At the time when solid-phase bonding is employed in the above-mentioned second step, the metallized layer, the Au soldering material, the Cr barrier layer, the Au soldering material, and the metal member may be solid-phase bonded together simultaneously.

Thus, according to the method of the present invention for producing a bonded member comprising different materials, the ceramic base material and the metal member which are different types of materials are solid-phase bonded via the precoat layer comprising the Au soldering material and the Cr barrier layer. Thus, one may obtain a bonded member in which diffusion of the metal member component into the soldering material is prevented and an increase in proof stress of the Au soldering material is suppressed by the barrier layer even when present inventive bonded member is used at a high temperature and bonding strength hardly lowers even at a high temperature. The bonded member comprising different materials according to the present invention is a bonded member comprising different materials which is obtained by the foregoing production method of the present invention.

Au used as the Au soldering material 5 used in the first step and the Au soldering material 9 used in the second step is a soft metal having low strength and may become a soldering material which alleviates thermal stress caused by thermal shock through plastic deformation. Accordingly, the bonded member of the present invention which is obtained by bonding different materials together by the production method of the present invention has high thermal shock resistance, improved thermal cycle properties, and can maintain good bonding strength and air tightness. Further, the amount of the Au soldering material to be used, although varying according to the shape of the bonded portion and other factors, may be any amount as long as it is sufficient to cover the placed active metal foil (in the case of the Au soldering material 5) or the placed Cr barrier layer (in the case of the Au soldering material 9) and may be adjusted within a range in which the Au soldering material can be molten by heating. In addition, the precoat layer preferably has a thickness of 20 μm or more in order to reduce thermal stress at the time of bonding. Further, in consideration of the fact that Au is an expensive soldering material, it is not necessarily desirable from the viewpoint of material costs to have a thickness of 2 mm or larger. Furthermore, when the ceramic portion is aluminum nitride having a flexural strength of around 300 to 400 MPa, the Au precoat layer preferably has a Vickers hardness of below $Hv_{0.1}80$ so as to avoid efficiently troubles at the time of bonding or being subjected to a thermal cycle.

Further, the active metal foil 4 is active against the ceramic base material 1. At the interface between the ceramic base material 1 and the Au soldering material 5, the active metal foil 4 dissolves in the Au soldering material 5 once and then forms a reaction product layer such as nitride with the ceramic base material. Thereby, wetting properties of the Au soldering material 5 against the ceramic base material 1 are improved, and a precoat layer 6 having good air tightness is formed. Further, a material of the active metal foil 4 is preferably at least one metal selected from the group consisting of Ti, Nb, Hf and Zr. Since the active metal foil 4 is constituted by any of these materials, the metal element constituting the active metal foil is nearly completely consumed at the interface between the foil and the Au soldering material and does not remain in the Au soldering material. Thereby, the strength of the Au soldering material 5 may be kept low so as to reduce thermal stress of the member to be bonded by a shock absorbing effect based on its plastic deformation and obtain a precoat layer having reliable air tightness. Consequently, a composite member having long-term reliability may be attained. Although the active metal is preferably in the form of foil as described above, it may take the form of a film formed from a paste material or a film formed on the ceramic base material by sputtering.

Further, a material of the ceramic base material is preferably at least one selected from the group consisting of aluminum nitride, silicon nitride, alumina, zirconia, magnesia, spinel and silicon carbide. The ceramic base material should be one which causes a reaction when heated together with the active metal, and the foregoing various materials can be used in the ceramic base material. The foregoing materials may constitute the ceramic base material alone or in combination. Therefore, by selecting a ceramic base material comprising one or more of these materials as required, bonded members having heat resistance, hardness and other properties corresponding to applications and apparatuses being integrated with these bonded members can be provided.

In a case where aluminium nitride (hereinafter referred to as "Al N") is used as a raw material of the above ceramic base material and Ti is used as the above active metal foil, a thin film layer of TiN is formed at the interface between AlN and the soldering material by heating. At this time, Ti is used up by a reaction with AlN. Hence, Ti does not dissolve into the soldering material, so that a precoat layer in which the low strength of the soldering material is maintained is formed. In this case, Ti is used in an amount of preferably 0.03 to 10 mass %, more preferably 0.1 to 2 mass %, based on the Au soldering material. When the amount is below 0.03 mass %, problems with respect to bonding may occur, while when the amount exceeds 10 mass %, Ti remains in the soldering material, so that AlN may crack due to an unfavorable increase in the proof stress of the soldering material.

In the second step, since solid-phase bonding is performed by pressurization and heating, it is possible to inhibit dissolution of constituents of the metal member into the bonding layer. Thus, the heating temperature at the time of solid-phase bonding is preferably lower than the melting point of the Au soldering material. More specifically, the heating temperature is preferably 750 to 1,000° C., more preferably 800 to 950° C.

A metal constituting the barrier layer 8 which is placed on the precoat layer 6 as shown in FIG.1 (b) is preferably Cr. By using Cr, diffusion of constituents in the metal member 7, particularly Ni, into the Au soldering material is inhibited, thereby suppressing an increase in the proof stress of the Au soldering material. Thereby, characteristics of Au, such as being a soft metal having low strength and alleviating thermal stress caused by thermal shock by plastic deformation, can be maintained. Further, since Cr is not hardened easily even if dissolved into the Au soldering material, there is no possibility that the barrier layer itself impairs the properties of the Au soldering material. Further, even if Ti is used as the active metal, Ti is not drawn to Cr (barrier layer), unlike when Pt is used, due to low affinity between Cr and Ti, and the strength of the bonded portion is not lowered.

Although the barrier layer 8 may be a plate as shown in FIG.1 (b), it may also be placed by plating the metal member 7 as shown in FIG. 1 (c). As for Cr plating, normal Cr plating and double Cr plating defined in JIS H8615 "Cr Plating for Industrial Applications" can be suitably used. However, porous Cr plating or crack Cr plating may also be used.

A material of the metal member is preferably at least one selected from the group consisting of Ni, Co, Cr and Fe or an alloy composed essentially of at least one selected from the group consisting of Ni, Co, Cr and Fe. Particularly, Ni and an Ni-based alloy have excellent oxidation resistance and can therefore be used in a high-temperature atmosphere for a long time without coating. The alloy composed essentially of at least one selected from the group consisting of Ni, Co, Cr and Fe is an alloy which contains Ni, Co, Cr and/or Fe in such a total amount that renders physical properties of any of the metal elements significantly noticeable and refers to an alloy having a total content of Ni, Co, Cr and Fe of 50% or more by mass. Illustrative examples of such an alloy include Inconel 600, Inconel 601, Nimonic 90, Pyromax, Incolloy 800, Incolloy 903, Hastelloy and Kovar.

These metals and alloys are hardly oxidized in an oxidation resistance test conducted at 800° C. in air. They have oxidation resistance required for them to be used as a constituent such as a feeding metal terminal of a susceptor for mounting semiconductor wafers which is used in production of semiconductors and has a function of a heater as well as excellent conductivity required for them to be used as a metal terminal. Therefore, they can constitute the member of the foregoing high-temperature heater. Further, these metals are also preferable in that they are inexpensive and easy to obtain.

The foregoing metal member is not limited to the shape shown in FIG. 1, and a variety of shapes such as a cylinder, prism, steeple, ring and the like can be used arbitrarily.

Figure 2A:
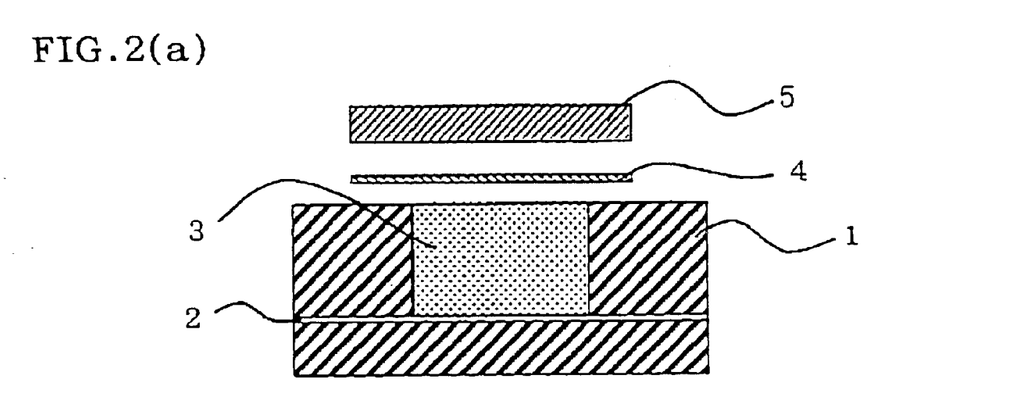
Figure 2B:
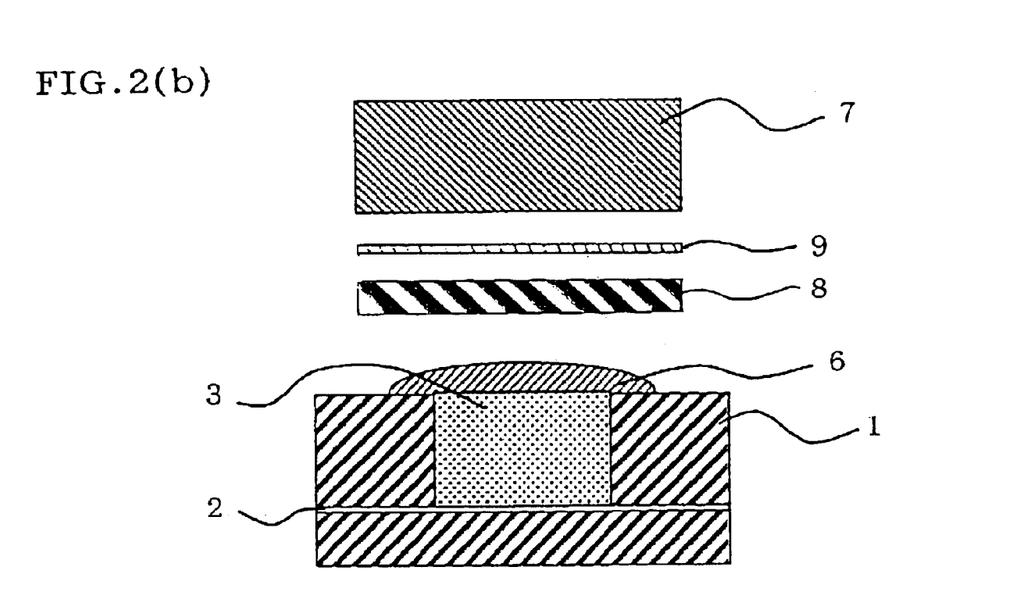

In the bonded member comprising different materials and its production method according to the present invention, a conductive material comprising Mo, W or an alloy of Mo and W may be embedded in the foregoing ceramic base material with a portion of the surface of the conductive material exposing from the ceramic base material. FIGS. 2 (a) and (b) exemplify the state and is a schematic diagram illustrating a second embodiment of the method for producing a bonded member of different materials according to the present invention. In FIGS. 2 (a) and (b), (a) shows a first step, and (b) shows a second step.

In a ceramic base material 1, an Mo mesh 2 and a conductive material (Mo) 3 which is placed in conduction with the Mo mesh 2 are embedded. In the first step, active metal foil 4 and a soldering material 5 are placed so as to cover the surface of the ceramic base material 1 and the surface of the conductive material (Mo) 3 and heated so as to form a precoat layer 6. In the subsequent second step, a barrier layer 8 which is a Cr plate is placed on the precoat layer 6, an Au soldering material 9 is placed on the barrier layer 8, a metal member 7 is placed on the Au soldering material 9, and they are pressurized and heated so as to be solid-phase bonded. The bonded member comprising different materials according to the present invention can also be obtained by the foregoing method for producing a bonded member comprising different materials according to the second embodiment of the present invention.

The active metal foil 4 used in the first step is active against the ceramic base material 1 and forms a reaction product layer at the interface between the ceramic base material 1 and the Au soldering material 5 and at the interface between the conductive material (Mo) 3 and the Au soldering material 5. Accordingly, wetting properties of the Au soldering material 5 against the ceramic base material 1 are improved. At the same time, air tightness is secured, so that the conductive material (Mo) 3 embedded in the ceramic base material 1 is not exposed to outside air and deterioration of the conductive material by oxidation therefore hardly occurs advantageously. The metal member to be bonded to such a conductive material embedded in the ceramic base material may be constituted as a terminal for feeding a current to the conductive material. When the bonded member is attached to a chamber for producing a semiconductor, the soldering material may be exposed to an inert or oxidizing atmosphere outside the chamber.

The bonded member comprising different materials according to the present invention hardly undergoes a reduction in strength caused by heat and is excellent in anti-thermal cycle properties and thermal shock resistance. Accordingly, it can be suitably used as a susceptor for mounting a semiconductor wafer which has a function of a heater in a semiconductor producing system, more specifically, as a bonded member incorporated into equipment which exhibits a function of an electrostatic chuck or a function of a heater by an internal metal electrode or metal heating unit. Further, when the bonded member comprising different materials according to the present invention is a bonded member as shown in FIG. 5 which is formed by bonding a ceramic susceptor for mounting a semiconductor wafer to a corrosion-resistant metal ring for attaching the susceptor to a chamber for producing a semiconductor, thermal stress which occurs can still be alleviated even if the bonded portion does not take the form shown in FIG. 6 or 7. At this time, a soldering material may be exposed to an inert or oxidizing atmosphere outside the chamber and to an atmosphere inside the chamber which has a lower pressure than the atmosphere outside the chamber.

Figure 3A:
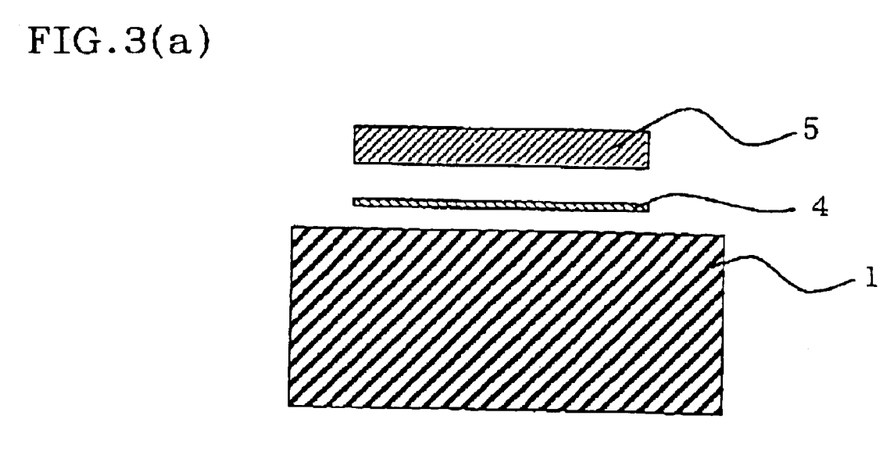
Figure 3B:
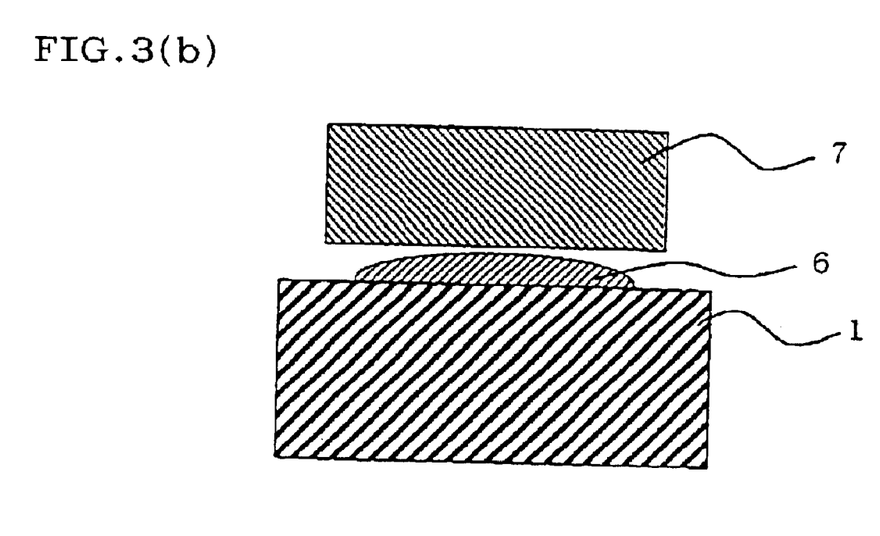

In another embodiment of the method for producing a bonded member comprising different materials according to the present invention, firstly, as shown in FIG. 3(a), by a method which is the same as the method for forming the precoat layer shown in FIG. 1(a), a precoat layer 6 is formed on a ceramic base material 1. Then, a metal member 7 shown in FIG. 3(b) which is Cr as shown in FIG. 1(c) is placed on the precoat layer 6, and they are pressurized and heated to be solid-phase bonded. Alternatively, it is also acceptable that the foregoing metallized layer is formed on a ceramic base material, an Au soldering material is placed between the metallized layer and a metal member comprising Cr, and they are pressurized and heated so as to be solid-phase bonded. Further, another bonded member comprising different materials according to the present invention is a bonded member comprising different materials which is obtained by the foregoing another production method of the present invention. As the metal member, an alloy composed essentially of Cr can be used in addition to Cr.

As described above, when Cr is used as a metal member, diffusion of the metal component into an Au soldering material can be prevented, even when the metal member and a ceramic base material are solid-phase bonded by use of the Au soldering material without using a barrier layer. Although the metal member to be used may be an alloy composed essentially of Cr, it seems that there are currently no such metal members which are mass-produced and sold on an industrial scale.

EXAMPLES

Hereinafter, examples of the present invention will be described. However, it is needless to say that the present invention shall not be limited to the following examples.

Examples 1 to 8

On an AlN ceramic base material (sintered body with an AlN purity of 99.9%, flexural strength: 360 MPa), 5 $\mu$m Ti foil and a 1,000 $\mu$m pure Au soldering material were placed, and they were molten by heating in a vacuum atmosphere at 1,100° C. for 10 minutes so as to form an Au precoat layer (thickness: 800 $\mu$m). As a result of measuring the hardness (Vickers hardness (load: 100 g) $Hv_{0.1}$) of the precoat layer, it was found to be 45 to 55. Further, when these bonded layers were removed by grinding so as to check occurrence of cracks in AlN, it was found that no cracks occurred in AlN.

On the precoat layer, a pure Cr plate having a thickness of 2 mm and a diameter of 6 mm, pure Au having a thickness of 200 $\mu$m, and an Inconel 601 (Fe-61Ni-23Cr-1.4Al) or Ni terminal having a diameter of 5 mm and a length of 20 mm were placed in order mentioned above. Then, they were heated in a vacuum atmosphere under a load of 10 MPa at 800° C. for 1 hour so as to be solid-phase bonded Examples 1 and 5. The hardness (measured at a position 50 $\mu$m away from AlN) $Hv_{0.1}$ of the precoat layer after the bonding was 45 to 55, which was found to be unchanged. Further, when these bonded terminals and layers were removed by grinding so as to check occurrence of cracks in AlN, it was found that no cracks occurred in AlN.

The foregoing bonded members were kept in air at 800° C. for 100 hours, 850° C. for 100 hours, and 900° C. for 100 hours Examples 2 to 4 and 6 to 8. For those kept at 800° C. and 850° C., the hardness $Hv_{0.1}$ of the precoat layer was 45 to 55, which was found to be unchanged. For those kept at 900° C., the hardness $Hv_{0.1}$ of the precoat layer was increased to 55 to 65. However, as shown in FIG. 4, the change is not particularly problematic for the bonded members. Further, when the bonded layers were removed by grinding so as to check occurrence of cracks in AlN, it was found that no cracks occurred in AlN. The following tensile test was conducted on the foregoing bonded members of Examples 1 to 8. The results are shown in Table 1. In the tensile test, tensile strengths of the foregoing bonded members characterized by: metal terminal φ5 mm×20 mmt+ soldering material=Au and others φ5 mm×0.5 mmt+ceramic base material=ALN 20 mm×5 mmt were measured at a pulling rate of 0.5 mm/min.

TABLE 1

| | Metal Member Terminal | Barrier Layer (Cr) | Condition for Precoating | Condition for soldering | Condition for Keeping Bonded Member at High Temperature | Hardness $Hv_{0.1}$ of Au Layer | Occurrence of Cracks After Bonding/ Keeping at High Temp. | Strength of Bonded Portion (Tensile Test) |
|---|---|---|---|---|---|---|---|---|
| Example 1 | Inconel 601 | 2 mm-thick Cr Plate | 1100° C. 10 min | 800° C. for 1 hour under load of 10 MPa | After Soldering | 45–55 | No Cracks | 100 MPa or higher (Cracks occurred in AlN) |
| Example 2 | Inconel 601 | 2 mm-thick Cr Plate | 1100° C. 10 min | 800° C. for 1 hour under load of 10 MPa | After Kept at 800° C. for 100 hours | 45–55 | No Cracks | 100 MPa or higher (Cracks occurred in AlN) |
| Example 3 | Inconel 601 | 2 mm-thick Cr Plate | 1100° C. 10 min | 800° C. for 1 hour under load of 10 MPa | After Kept at 850° C. for 100 hours | 45–55 | No Cracks | 100 MPa or higher (Cracks occurred in AlN) |
| Example 4 | Inconel 601 | 2 mm-thick Cr Plate | 1100° C. 10 min | 800° C. for 1 hour under load of 10 MPa | After Kept at 900° C. for 100 hours | 55–65 | No Cracks | 100 MPa or higher (Cracks occurred in AlN) |
| Example 5 | Ni | 2 mm-thick Cr Plate | 1100° C. 10 min | 800° C. for 1 hour under load of 10 MPa | After Soldering | 45–55 | No Cracks | 100 MPa or higher (Cracks occurred in AlN) |
| Example 6 | Ni | 2 mm-thick Cr Plate | 1100° C. 10 min | 800° C. for 1 hour under load of 10 MPa | After Kept at 800° C. for 100 hours | 45–55 | No Cracks | 100 MPa or higher (Cracks occurred in AlN) |
| Example 7 | Ni | 2 mm-thick Cr Plate | 1100° C. 10 min | 800° C. for 1 hour under load of 10 MPa | After Kept at 850° C. for 100 hours | 45–55 | No Cracks | 100 MPa or higher (Cracks occurred in AlN) |
| Example 8 | Ni | 2 mm-thick Cr Plate | 1100° C. 10 min | 800° C. for 1 hour under load of 10 MPa | After Kept at 900° C. for 100 hours | 55–65 | No Cracks | 100 MPa or higher (Cracks occurred in AlN) |
| Example 9 | Ni | 20 μm thick Plating | 1100° C. 10 min | 800° C. for 1 hour under load of 10 MPa | After Soldering | 45–55 | No Cracks | 100 MPa or higher (Cracks occurred in AlN) |
| Example 10 | Ni | 20 μm thick Plating | 1100° C. 10 min | 800° C. for 1 hour under load of 10 MPa | After Kept at 800° C. for 100 hours | 45–55 | No Cracks | 100 MPa or higher (Cracks occurred in AlN) |
| Example 11 | Kovar | 20 μm thick Plating | 1100° C. 10 min | 800° C. for 1 hour under load of 10 MPa | After Soldering | 45–55 | No Cracks | 100 MPa or higher (Cracks occurred in AlN) |
| Example 12 | Kovar | 20 μm thick Plating | 1100° C. 10 min | 800° C. for 1 hour under load of 10 MPa | After Kept at 700° C. for 100 hours | 45–55 | No Cracks | 100 MPa or higher (Cracks occurred in AlN) |
| Example 13 | Kovar | 20 μm thick Plating | 1100° C. 10 min | 800° C. for 1 hour under load of 10 MPa | After Kept at 800° C. for 100 hours | 45–55 | No Cracks | 45 MPa (Kovar was oxidized and separated from solder material) |
| Comparative Example 1 | Ni | No Barrier Layer | 1100° C. 10 min | 800° C. for 1 hour under load of 10 MPa | After Soldering | 45–55 | No Cracks | 100 MPa or higher (Cracks occurred in AlN) |
| Comparative Example 2 | Ni | No Barrier Layer | 1100° C. 10 min | 800° C. for 1 hour under load of 10 MPa | After Kept at 700° C. for 100 hours | 45–55 | No Cracks | 100 MPa or higher (Cracks occurred in AlN) |
| Comparative Example 3 | Ni | No Barrier Layer | 1100° C. 10 min | 800° C. for 1 hour under load of 10 MPa | After Kept at 800° C. for 100 hours | 190–240 | Cracks Occurred | — |

Examples 9 to 13

As in the foregoing Examples 1 to 8, a precoat layer was formed on an AlN ceramic base material, a Kovar (Fe-29Ni-17Co) or Ni terminal having a diameter of 5 mm and a length of 20 mm and plated with Cr to a thickness of 20 μm was placed on the precoat layer, and they were solid-phase bonded at 800° C. for 1 hour under a load of 10 MPa Examples 9 and 11.

The foregoing bonded member having the Ni terminal was kept in air at 700° C. for 100 hours Example 10, while the foregoing bonded member having the Kovar terminal was kept in air at 700° C. for 100 hours or 800° C. for 100 hours Examples 12 or 13. In all these bonded members, the hardness $Hv_{0.1}$ of the precoat layer was 45 to 55, which was found to be unchanged. When the bonded layers were removed by grinding so as to check occurrence of cracks in AlN, it was found that no cracks occurred in AlN. The foregoing tensile test was conducted on the bonded members of the foregoing Examples 9 to 13. The results are shown in Table 1.

Comparative Examples 1 to 3

As in the foregoing Examples 1 to 8, a precoat layer was formed on an AlN ceramic base material, an Ni terminal having a diameter of 5 mm and a length of 20 mm was placed on the precoat layer, and they were solid-phase bonded at 800° C. for 1 hour under a load of 10 MPa Comparative Example 1.

The foregoing bonded member was kept in air at 700° C. for 100 hours or 800° C. for 100 hours Comparative Examples 2 and 3.

For Comparative Examples 1 and 2, the hardness $Hv_{0.1}$ of the precoat layer was 45 to 55, which was found to be unchanged, and when the bonded layers were removed by grinding so as to check occurrence of cracks in AlN, it was found that no cracks occurred in AlN. Meanwhile, for Comparative Example 3, the hardness $Hv_{0.1}$ of the precoat layer was increased to 190 to 240, and when the bonded layers were removed by grinding so as to check occurrence of cracks in AlN, it was found that cracks occurred in AlN.

Thus, it was found that when the Ni terminal and the AlN ceramic base material were bonded by means of an Au soldering material without Cr interposed therebetween, the hardness of the precoat layer formed from the Au soldering material increased significantly when the bonded member was kept at 800° C. for 100 hours and cracks occur in AlN, while when Ni (Inconel or Kovar) and AlN were bonded by means of an Au soldering material with a Cr plate or Cr plating interposed between Ni and a precoat layer, the hardness of the precoat layer did not increase significantly even if kept at 800° C. or higher, and no cracks occurred in AlN. The foregoing tensile test was conducted on the bonded members of the foregoing Comparative Examples 1 to 3. The results are shown in Table 1.

Further, for the bonded members of the foregoing Examples 5, 6 and 8 and Comparative Examples 1 to 3, a state of diffusion of impurity (Cr or Ni) into the precoat layer and a change in the hardness of the precoat layer were measured in detail. For the bonded members of Examples 5, 6 and 8, the concentration of Cr (mass % (result of EDS analysis)) and the hardness ($Hv_{0.1}$ (based on JIS Z2244)) of the precoat layer were measured at positions 20, 50, 100, 200, 300 and 400 μm away from Cr, while for Comparative Examples, the concentration of Ni (mass % (result of EDS analysis)) and the hardness ($Hv_{0.1}$ (based on JIS Z2244)) of the precoat layer were measured at positions 20, 50, 100, 200, 300 and 400 μm away from Ni. Further, in Examples 5, 6 and 8 and Comparative Examples 1 to 3, the foregoing measurements were also made at positions 20, 50 and 100 μm away from AlN. The results are shown in Tables 2 and 3.

TABLE 2

| Distance from Cr or AlN | Example 5 After Soldering | | Example 6 After Kept at 800° C. for 100 Hours | | Example 8 After Kept at 900° C. for 100 Hours | |
|---|---|---|---|---|---|---|
| | Concentration of Cr mass % | Hardness $Hv_{0.1}$ | Concentration of Cr Mass % | Hardness $Hv_{0.1}$ | Concentration of Cr mass % | Hardness $Hv_{0.1}$ |
| 20 μm from Cr | <0.1 | 45 | 11.1 | 90 | 11.2 | 148 |
| 50 μm from Cr | <0.1 | | 8 | | 10.4 | 92 |
| 100 μm from Cr | <0.1 | | 3.6 | | 9 | |
| 200 μm from Cr | <0.1 | | 1.3 | | 6.7 | |
| 300 μm from Cr | <0.1 | 39 | 0.6 | 43 | 3.4 | 62 |
| 400 μm from Cr | <0.1 | | 0.3 | | 2.1 | |
| 100 μm from AlN | <0.1 | | 0.3 | | 0.8 | |
| 50 μm from AlN | <0.1 | | 0.2 | | 0.5 | |
| 20 μm from AlN | <0.1 | 42 | 0.2 | 42 | 0.2 | 50 |

TABLE 3

| Distance from Ni or AlN | Comparative Example 1 After bonding | | Comparative Example 2 After Kept at 700° C. for 100 Hours | | Comparative Example 3 After Kept at 800° C. for 100 Hours | |
|---|---|---|---|---|---|---|
| | Concentration of Ni mass % | Hardness $Hv_{0.1}$ | Concentration of Ni mass % | Hardness $Hv_{0.1}$ | Concentration of Ni mass % | Hardness $Hv_{0.1}$ |
| 20 μm from Ni | <0.1 | 115 | 7.5 | 135 | 13 | 225 |
| 50 μm from Ni | | | | | | |
| 100 μm from Ni | <0.1 | 54 | 1.3 | 65 | | |
| 200 μm from Ni | | | | | | |
| 300 μm from Ni | <0.1 | 52 | 0.5 | 52 | 11.5 | 175 |
| 400 μm from Ni | | | | | | |
| 100 μm from AlN | <0.1 | 39 | 0.3 | 62 | | |
| 50 μm from AlN | | | | | | |
| 20 μm from AlN | <0.1 | 42 | 0.2 | 42 | 7.2 | 145 |

It is understood from Tables 2 and 3 that when Cr is interposed between Ni and the precoat layer, Cr can suppress an increase in the hardness of the precoat layer effectively because Cr atoms are diffused into the Au layer slower than Ni atoms and its effect of hardening the precoat layer when dissolved is small even if diffused in the precoat layer.

It is understood from Table 4 that when the ceramic portion is aluminium nitride having a flexural strength of about 300 to 400 MPa as in these Examples, the hardness of the precoat layer comprising the Au soldering material is preferably below $Hv_{0.1}80$ so as to avoid cracks in the base material effectively.

TABLE 4

| Hardness of Soldering material $Hv_{0.1}$ | Occurrence of Cracks in AlN |
|---|---|
| up to 49 | No cracks were found. |
| 50 to 59 | No cracks were found. |
| 60 to 69 | No cracks were found. |
| 70 to 79 | No cracks were found. |
| 80 to 89 | Cracks were found in some samples. |
| 90 to 99 | Cracks were found in some samples. |
| 100 to 129 | Cracks were found in some samples. |
| 130 to 159 | Cracks were found in all samples. |
| 160 to 189 | Cracks were found in all samples. |

Table 4 shows, together with hardnesses of Au soldering materials, the results of checking occurrence of cracks in AlN in bonded members each of which was prepared by bonding a metal member with AlN (sintered body having an AlN purity of 99.9%, flexural strength: 360 MPa) by use of the Au soldering material and active metal Ti. In the checked samples or Au soldering materials, various elements are diffused, and these elements increase the hardnesses of the Au soldering materials to those shown in Table 4. Therefore, the compositions of the metals diffused into the Au soldering materials are not necessarily the same. The hardnesses of the soldering materials were measured at a position about 30 μm distant from the bonded AlNs. For evaluation, the hardnesses of the samples and the presence or absence of cracks in AlN were checked, and the occurrence of the cracks in AlN was evaluated for each hardness range (e.g., Hv0.150 to 59, 60 to 69, and the like). Ten or more samples were checked in each hardness range. When no cracks were found in ALN in all samples in a particular hardness range, it was evaluated as "No cracks were found." When cracks were found in AlN in some samples in a particular hardness range, it was evaluated as "Cracks were found in some samples.", and when cracks were found in AlN in all samples in a particular hardness range, it was evaluated as "Cracks were found in all samples." Further, even in the hardness ranges where no cracks were found, lower hardness of Au is more preferable since residual stress at a bonded portion becomes lower and bonding strength becomes higher.

As described above, according to the method of the present invention for producing a bonded member comprising different materials, a ceramic base material and a metal member which are different materials are solid-phase bonded via an Au soldering material (precoat layer) and a barrier layer or a ceramic base material and a metal member comprising Cr or an alloy composed essentially of Cr are solid-phase bonded via an Au soldering material. Thereby, there can be obtained a bonded member in which diffusion of a metal material such as Ni which hardens severely when dissolved and solidified in the Au soldering material into the soldering material is prevented and an increase in proof stress of the Au soldering material are suppressed by the barrier layer even when used at high temperatures and bonding strength hardly lowers even at high temperatures. Further, the bonded member comprising different materials according to the present invention is a bonded member comprising different materials which is obtained by the foregoing production method of the present invention.

What is claimed is:

1. A different materials bonded member comprising a ceramic base material and a metal member which are solid-phase bonded via a soldering material comprising Au, wherein an active metal foil is placed on a surface of the ceramic base material, the soldering material is placed on the active metal foil, the active metal foil and the soldering material are heated to form a precoat layer, the metal member is placed on the surface of the precoat layer via a Cr barrier layer, and the precoat layer and the metal member are pressurized and heated so as to be solid-phase bonded.

2. The different materials bonded member according to claim 1, wherein the precoat layer has a thickness of 20 μm or more.

3. The different materials bonded member according to claim 1, wherein the barrier layer is formed by plating the metal member.

4. A different materials bonded member comprising a ceramic base material and a metal member which are solid-phase bonded via a soldering material comprising Au, wherein a metallized layer is formed on a surface of the ceramic base material with a paste or by a vapor phase process, the soldering material is placed on the metallized layer, the soldering material is heated to form a precoat layer, the metal member is then placed on the surface of the precoat layer via a Cr barrier layer, and the precoat layer and the metal member are pressurized and heated so as to be solid-phase bonded.

5. The different materials bonded member of claim 4, further comprising another soldering material between the metal member and the barrier layer, and the metallized layer, the barrier layer and the metal member are solid-phase bonded simultaneously by pressuring and heating them with said another soldering material and the precoat layer placed therebetween.

6. The different materials bonded member according to claim 4, wherein the precoat layer has a thickness of 20 μm or more.

7. A different materials bonded member comprising a ceramic base material and a metal member which are solid-phase bonded via a soldering material comprising Au, wherein an active metal foil is placed on a surface of the ceramic base material, the soldering material is placed on the active metal foil, the active metal foil and the soldering material are heated to form a precoat layer, the metal member is placed on the surface of the precoat layer via a barrier layer, and the precoat layer and the metal member are pressurized and heated so as to be solid-phase bonded, wherein the precoat layer has a hardness of below $Hv_{0.1}80$.

8. The different materials bonded member according to claim 7, wherein a metal constituting the metal member is at least one selected from the group consisting of Ni, Co, Cr and Fe or an alloy containing at least one metal selected from the group consisting of Ni, Co, Cr and Fe as a major component.

9. The different materials bonded member according to claim 7, wherein the precoat layer has a thickness of 20 μm or more.

10. The different materials bonded member according to claim 7, wherein the barrier layer is formed by plating the metal member.

11. The different materials bonded member according to claim 7, wherein the bonded member is attached to a chamber for producing a semiconductor.

12. The different materials bonded member according claim 11, wherein the soldering material is capable of withstanding exposure to inert or oxidizing atmospheres outside the chamber and capable of withstanding exposure to a reduced pressure atmosphere inside the chamber.

13. The different materials bonded member according to claim 7, which is a component formed by bonding a ceramic susceptor for mounting a semiconductor wafer to a corrosion-resistant metal ring for attaching the susceptor to a chamber for producing a semiconductor.

14. The different materials bonded member according to claim 13, wherein the soldering material is capable of withstanding exposure to inert or oxidizing atmospheres outside the chamber and capable of withstanding exposure to a reduced pressure atmosphere inside the chamber.

15. A different materials bonded member comprising a ceramic base material and a metal member which are solid-phase bonded via a soldering material comprising Au, wherein an active metal foil is placed on a surface of the ceramic base material, the soldering material is placed on the active metal foil, the active metal foil and the soldering material are heated to form a precoat layer, the metal member is placed on the surface of the precoat layer via a barrier layer, and the precoat layer and the metal member are pressurized and heated so as to be solid-phase bonded, wherein a conductive material comprising Mo, W or an alloy of Mo and W is embedded in the ceramic base material with a portion of the surface of the conductive material extending from the ceramic base material.

16. A different materials bonded member comprising a ceramic base material and a metal member which are solid-phase bonded via a soldering material comprising Au, wherein an active metal foil is placed on a surface of the ceramic base material, the soldering material is placed on the active metal foil, the active metal foil and the soldering material are heated to form a precoat layer, the metal member is placed on the surface of the precoat layer via a barrier layer, and the precoat layer and the metal member are pressurized and heated so as to be solid-phase bonded, wherein the bonded member is a susceptor for mounting a semiconductor wafer, and the susceptor functions as one or more of a heater and an electrostatic chuck.

17. The different materials bonded member according claim 16, wherein the metal member is a terminal for feeding a current to an embedded conductive material, and the soldering material is exposed to an inert or oxidizing atmosphere outside a chamber.

18. A different materials bonded member comprising a ceramic base material and a metal member which are solid-phase bonded via a soldering material, wherein an active metal is placed on a surface of the ceramic base material, the soldering material comprising Au is placed on the active metal, the active metal and the soldering material are heated to form a precoat layer, the metal member comprising Cr or an alloy of Cr is placed on the precoat layer, and the precoat layer and the metal member are pressurized and heated so as to be solid-phase bonded.

19. A different materials bonded member comprising a ceramic base material and a metal member which are solid-phase bonded via a soldering material, wherein a metallized layer is formed on a surface of the ceramic base material with a paste or by a vapor phase process, the soldering material comprising Au is placed on the metallized layer, the Au soldering material is heated to form a precoat layer, the metal member comprising Cr or an alloy of Cr is placed on the precoat layer, and the precoat layer and the metal member are pressurized and heated so as to be solid-phase bonded.

20. The different materials bonded member according to claim 19, wherein the Au soldering material is heated to a molten state when forming the precoat layer.

21. The different materials bonded member according claim 19, wherein the Au soldering material is pressurized and heated, and is in a non-molten state when forming the precoat layer so us to be solid-phase bonded to the metallized layer.

22. A different materials bonded member comprising a ceramic base material and a metal member which are solid-phase bonded via a soldering material comprising Au, wherein a metallized layer is formed on a surface of the ceramic base material with a paste or by a vapor phase process, the soldering material is placed on the metallized layer, the soldering material is heated to form a precoat layer, the metal member is then placed on the surface of the precoat layer via a barrier layer, and the precoat layer and the metal member are pressurized and heated so as to be solid-phase bonded, wherein the precoat layer has a hardness of below $Hv_{0.1}80$.

23. The different materials bonded member according to claim 22, wherein a metal constituting the metal member is at least one selected from the group consisting of Ni, Co, Cr and Fe or an alloy containing at least one metal select from the group consisting of Ni, Co, Cr and Fe as a major component.

24. The different materials bonded member according to claim 22, wherein the bonded member is attached to a chamber for producing a semiconductor.

25. The different materials bonded member according to claim 22, which is a component formed by bonding a ceramic susceptor for mounting a semiconductor wafer to a corrosion-resistant metal ring for attaching the susceptor to a chamber for producing a semiconductor.

26. The different materials bonded member according to claim 22, wherein the barrier layer is formed by plating the metal member.

27. The different materials bonded member according to claim 22, wherein the Au soldering material is heated to a molten state when forming the precoat layer.

28. The different materials bonded member according to claim 22, wherein the Au soldering material is pressurized and heated and is in a non-molten state when forming the precoat layer so as to be solid-phase bonded to the metallized layer.

29. The different materials bonded member of claim 22, further comprising another soldering material between the metal member and the barrier layer, and the in metallized layer, the barrier layer and the metal member are solid-phase bonded simultaneously by pressuring and heating them with said another soldering material and the precoat layer placed therebetween.

30. The different materials bonded member according to claim 22, wherein the precoat layer has a thickness of 20 $\mu$m or more.

31. A different materials bonded member comprising a ceramic base material and a metal member which are solid-phase bonded via a soldering material comprising Au, wherein a metallized layer is formed on a surface of the ceramic base material with a paste or by a vapor phase process, the soldering material is placed on the metallized layer, the soldering material is heated to form a precoat layer, the metal member is then placed on the surface of the precoat layer via a barrier layer, and the precoat layer and the metal member are pressurized and heated so as to be solid-phase bonded, wherein a conductive material comprising Mo, W or an alloy of Mo and W is embedded in the ceramic base material with a portion of the surface of the conductive material extending from the ceramic base material.

32. A different materials bonded member comprising a ceramic base material and a metal member which are solid-phase bonded via a soldering material comprising Au, wherein a metallized layer is formed on a surface of the ceramic base material with a paste or by a vapor phase process, the soldering material is placed on the metallized layer, the soldering material is heated to form a precoat layer, the metal member is then placed on the surface of the precoat layer via a barrier layer, and the precoat layer and the metal member are pressurized and heated so as to be solid-phase bonded, wherein the base member is a susceptor for mounting a semiconductor wafer and the susceptor functions as any one of a heater and an electrostatic chuck.

* * * * *

UNITED STATES PATENT AND TRADEMARK OFFICE
CERTIFICATE OF CORRECTION

PATENT NO. : 6,881,499 B2
DATED : April 19, 2005
INVENTOR(S) : Masayuki Shinkai, Takahiro Ishikawa and Masahiro Kida It is certified that error appears in the above-identified patent and that said Letters Patent is hereby corrected as shown below:

<u>Title page,</u>
Item [57], ABSTRACT
Line 10, please add -- and -- before "heated"

<u>Column 18,</u>
Line 31, please add -- to -- after "according"
Line 63, please change "us" to -- as --

<u>Column 19,</u>
Line 37, please delete "in" before "metallized"

Signed and Sealed this

Twenty-eighth Day of June, 2005

JON W. DUDAS
*Director of the United States Patent and Trademark Office*